Aug. 22, 1950     R. W. BRADLEY     2,519,736
POULTRY FOUNTAIN

Filed March 21, 1945     2 Sheets-Sheet 1

Inventor
Roy W. Bradley,

By Clarence A. O'Brien
and Harvey B. Jacobson
Attorneys

Aug. 22, 1950     R. W. BRADLEY     2,519,736
POULTRY FOUNTAIN
Filed March 21, 1945     2 Sheets-Sheet 2
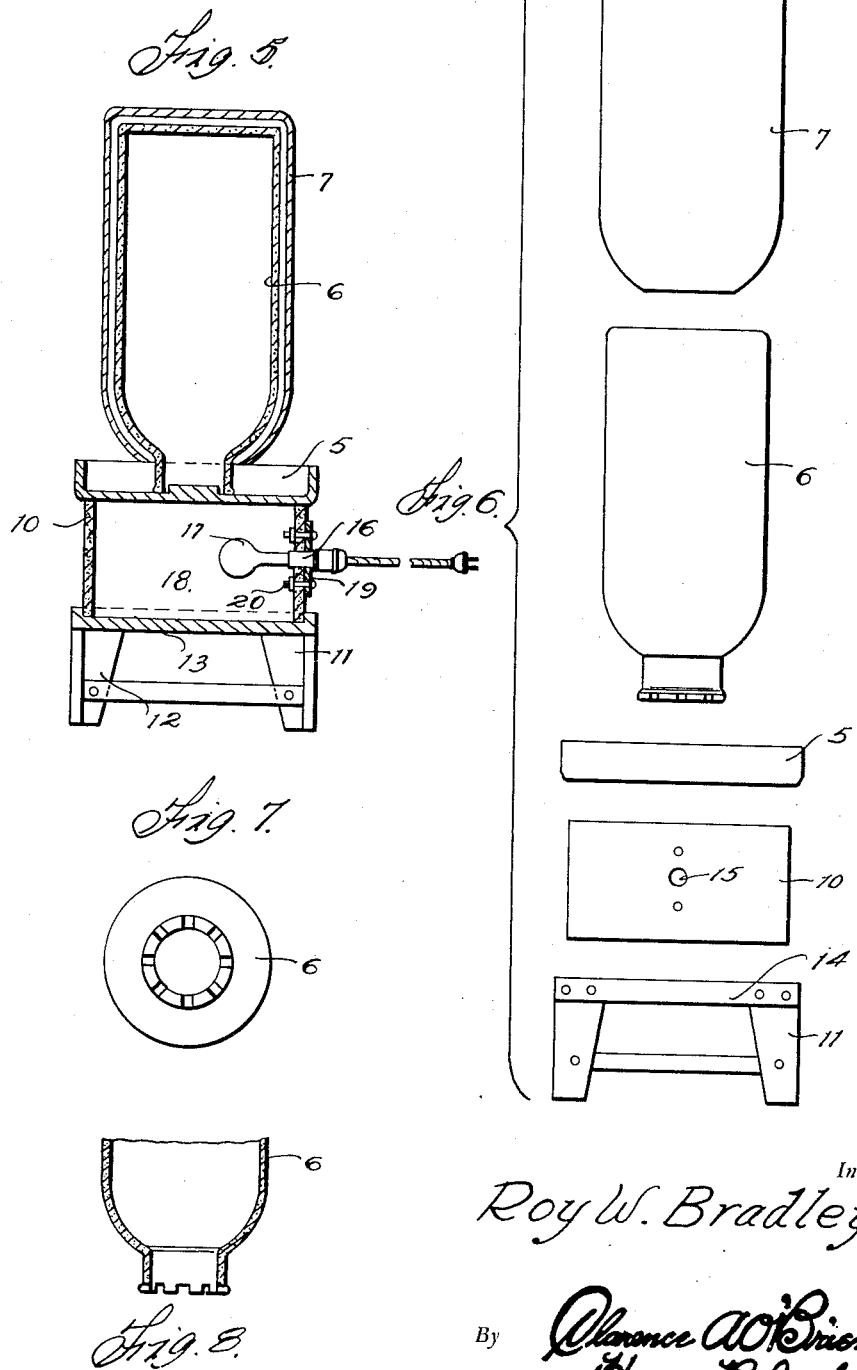

Patented Aug. 22, 1950

2,519,736

UNITED STATES PATENT OFFICE 2,519,736

POULTRY FOUNTAIN

Roy W. Bradley, Flint, Mich.

Application March 21, 1945, Serial No. 583,867

2 Claims. (Cl. 219—45)

The present invention relates to new and useful improvements in poultry fountains and has for its primary object to provide a device of this character embodying means to prevent the water from freezing in cold weather.

More specifically, the invention comprises heating means for a poultry fountain of conventional construction of a type including a pan or tray in which a bottle of water is supported in inverted position and arranged to maintain a supply of water in the pan at a predetermined level and to provide a flexible cover for the bottle, as well as electric heating and illuminating means beneath the pan to prevent freezing of the water in the bottle as well as the water in the pan.

The heating and illuminating means not only furnishes heat to warm the water for the poultry but also furnishes equally necessary light for night feeding, eliminating the added chore of turning on a coop light for a period of time in the late evening and again in early morning, through the provisions of a transparent heating chamber beneath the water tray and in which a single electric bulb is mounted, for warming the water and illuminating the watering tray.

A further object of the invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 5 is a vertical sectional view,

Figure 6 is a group elevational view of the several parts of the device,

Figure 7 is a bottom plan view of the bottle, and

Figure 8 is a fragmentary vertical sectional view of the bottom portion of the bottle.

Figure 1:
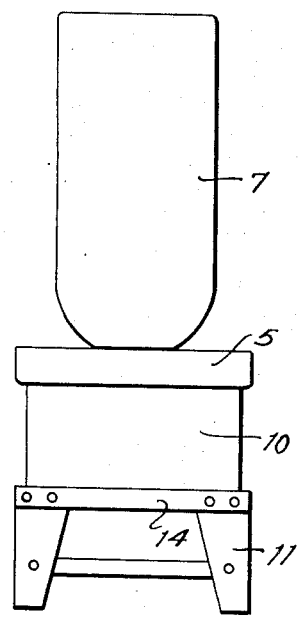
Figure 1 is a side elevational view.
Figure 2:
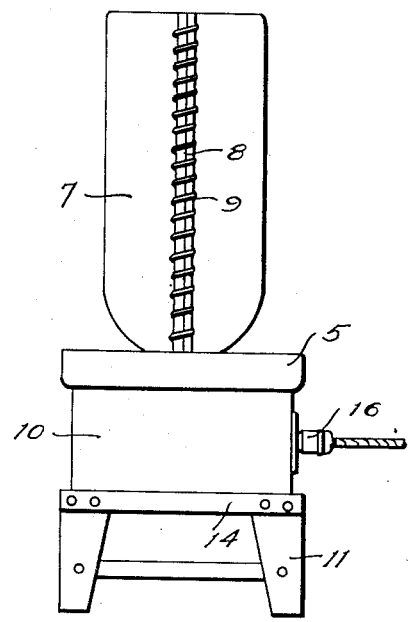
Figure 2 is a similar view of another side of the device.
Figure 3:
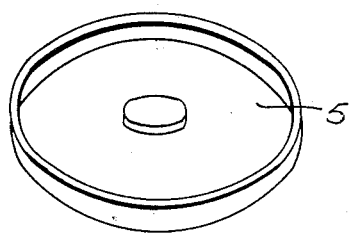
Figure 3 is a perspective view of the watering pan or tray.
Figure 4:
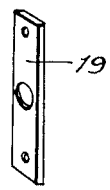
Figure 4 is a perspective view of the attaching plate for the lamp socket.

Referring now to the drawings in detail wherein, for the purpose of illustration, I have disclosed a preferred embodiment of the invention, the numeral 5 designates an open watering pan or tray on which a bottle 6 is supported in inverted position and adapted to automatically supply water to the pan to maintain the water at a predetermined level in the pan. The pan and bottle are of conventional construction.

The sides and top of the inverted bottle are enclosed in a cover designated generally at 7, the cover preferably being formed of soft flexible material 7a, such as wool or the like, and an outer layer of canvas 7b or similar material, the cover being slit longitudinally from its bottom through its top to provide a vertically extending opening 8 in one side thereof and secured in a closed position by lacing or the like 9 passed through suitable apertures, not shown, in the edges 8a of said opening 8, which are drawn thereby into side-by-side sealed relation.

The pan or tray 5 is supported on the upper edge of a relatively wide band or ring 10 constructed of glass or other suitable transparent material and with the lower edge of the band supported on a stand 11. The stand 11 includes leg portions 12 and a top 13 which closes the bottom of the band 10 and the marginal edge of the top 13 is formed with a short upstanding wall 14 within which the band 10 is positioned to prevent slipping of the band on the stand.

One side of the band 10 is formed with an opening 15 in which a lamp socket 16 is inserted for supporting an electric lamp 17 within the chamber 18 formed by the band 10 between the top 13 of the stand and the bottom of the tray 5. The socket 16 is secured in tight fitting engagement in the opening 15 by means of an apertured plate 19 secured to the band by bolts or the like 20.

The band 10 provides a closed chamber within which heat from the lamp 17 is retained and thus serves to heat the bottom of the pan 5 to prevent water therein from freezing in cold weather.

The water in the bottle 6 will also be partially heated by the bottom of the tray 5 and will further be protected from freezing by the flexible cover 7 enclosing the bottle.

As will be noted in Figure 5, the flexible covering 7 terminates at the neck of the bottle 6 substantially level with the rim of the pan 5. This provides for transfer of heat from water in the pan to the water in the neck of the bottle 6 and contributes toward preventing freezing of the water in the bottle.

In view of the foregoing description taken in conjunction with the accompanying drawings, it is believed that a clear understanding of the construction, operation and advantages of the device will be quite apparent to those skilled in the art.

A more detailed description thereof is, accordingly, deemed unnecessary.

It is to be understood, however, that even though I have herein shown and described a preferred embodiment of the invention that the same is susceptible to certain changes fully comprehended by the spirit of the invention as herein described, and within the scope of the appended claims.

Having thus described the invention, what I claim is:

1. A heating attachment for poultry fountains of a type including a pan adapted to contain water therein, said attachment comprising a transparent annular member adapted for supporting the pan on its upper edge, a stand supporting the lower edge of said annular member for removal therefrom and closing the bottom thereof to form a closed transparent chamber below the pan, and an electric lamp supported in the side of said annular member for removal therewith and extending into said chamber for heating and illuminating the bottom of the pan and illuminating the chamber.

2. A poultry fountain of a type including a pan having a bottle supported in inverted position thereon and adapted to maintain water at a predetermined level in the pan, and a flexible cover for said bottle adapted to prevent freezing of water therein, and means below the pan for heating water therein, said cover terminating on said bottle at substantially the top of the pan to provide for transfer of heat from the water in the pan to the neck of the bottle to additionally prevent freezing of the water in said bottle.

ROY W. BRADLEY.

REFERENCES CITED

The following references are of record in the file of this patent:

UNITED STATES PATENTS

| Number | Name | Date |
| --- | --- | --- |
| 479,549 | Botsford | July 26, 1892 |
| 581,952 | Amos | May 4, 1897 |
| 663,306 | Tompkins | Dec. 4, 1900 |
| 747,025 | White | Dec. 15, 1903 |
| 1,144,508 | Taylor | June 29, 1915 |
| 1,388,974 | Schreiber | Aug. 30, 1921 |
| 1,395,485 | Duncan et al. | Nov. 1, 1921 |
| 1,793,431 | Pelmulder | Feb. 17, 1931 |
| 1,877,084 | Tolley | Sept. 13, 1932 |
| 1,929,789 | Olson | Oct. 10, 1933 |
| 2,303,282 | Kirby | Nov. 24, 1942 |
| 2,417,802 | Longstreet | Mar. 18, 1947 |

FOREIGN PATENTS

| Number | Country | Date |
| --- | --- | --- |
| 615,748 | France | Jan. 14, 1927 |